Oct. 8, 1935.  M. F. RICHARDSON  2,016,390
VALVE
Filed Feb. 18, 1933  2 Sheets-Sheet 1
FIG. I.
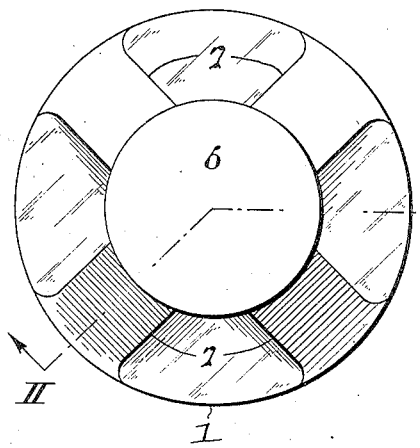
FIG. II.
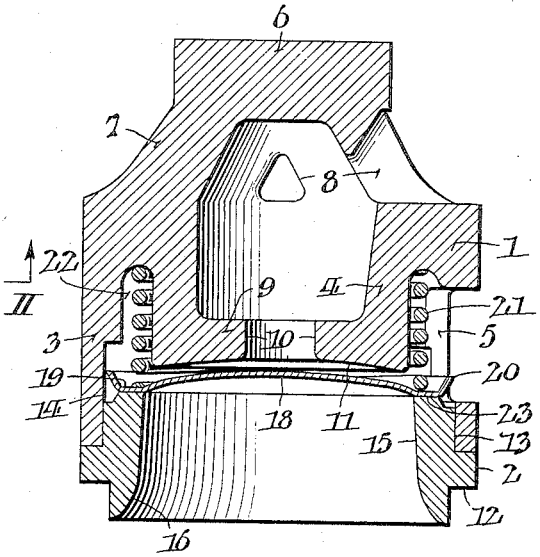
FIG. III.
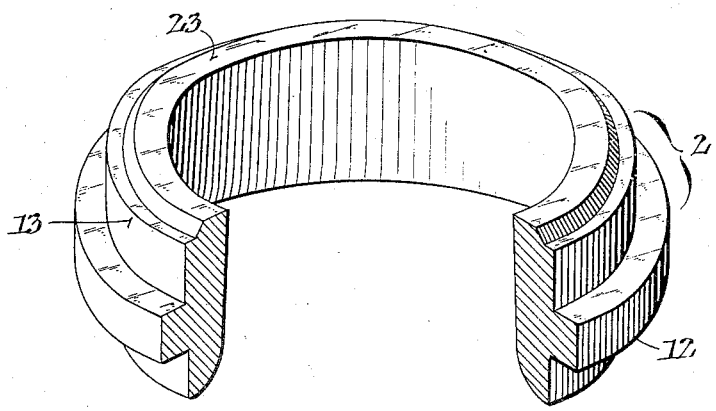
FIG. IV.
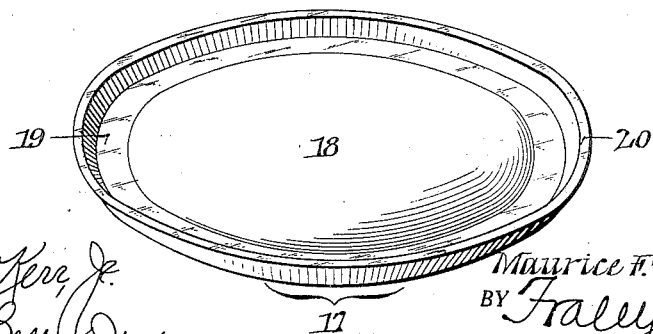
WITNESSES:
INVENTOR:
Maurice F. Richardson,
BY
ATTORNEYS.

Oct. 8, 1935.   M. F. RICHARDSON   2,016,390
VALVE
Filed Feb. 18, 1933   2 Sheets-Sheet 2
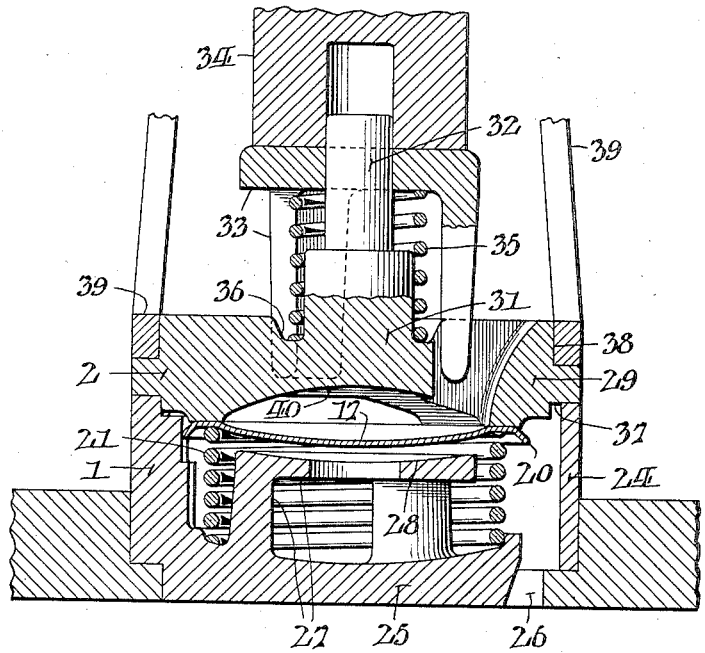
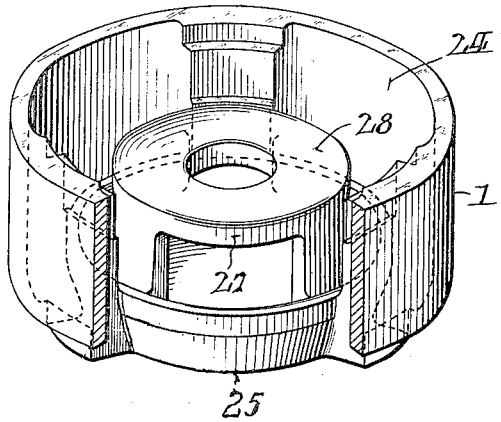
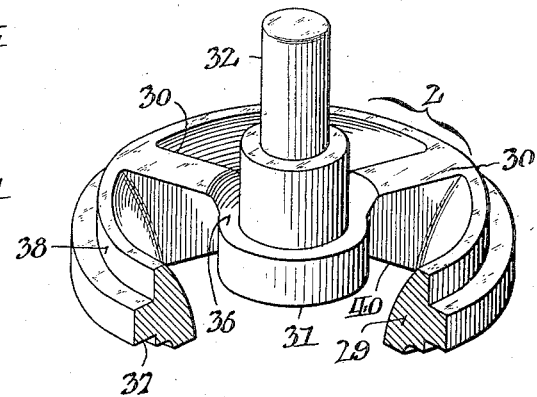
WITNESSES
INVENTOR:
Maurice F. Richardson,
BY
ATTORNEYS.

Patented Oct. 8, 1935

2,016,390

UNITED STATES PATENT OFFICE 2,016,390

VALVE

Maurice F. Richardson, Berwyn, Pa.

Application February 18, 1933, Serial No. 657,349

1 Claim. (Cl. 251—119)

This invention relates generally to valves for use in liquid or gas compressors, and pumps capable of operating responsively to suction or pressure pulses in opening and closing the valve ports, such valves usually including stop means limiting "lift" of the disc element and guide means to prevent lateral displacement or "canting" of said element.

The present invention has for its primary object the provision of a novel type of valve disc which is devoid of any inner seating surface or central support, while at the same time it is so shaped and spring-influenced as to be positively maintained in proper balance under all normal service conditions.

Another object is the provision of a valve disc of the indicated type which is so formed as to be free of any tendency to "slow opening" incident to being what may be termed as floatingly-supported during operation.

A further object has reference to structural refinements in the valve whereby the disc aforesaid is rendered positive in action, the valve as a unit is simplified in construction, and its efficiency enhanced.

The stated objects are attained by means of the combinations and arrangements of parts to be hereinafter described and claimed; and in order that the same may be clearly understood reference is had to the accompanying drawings, forming a part of this specification, wherein typical embodiments of the invention are illustrated.

In the drawings:

Fig. I is a top plan view of a valve unit embodying the present invention.

Fig. II is a staggered vertical section, taken as indicated by the arrows II—II in Fig. I.

Fig. III is a perspective view, with a portion broken out to better disclose the structural formation, of the valve seating-element shown in Fig. II.

Fig. IV is a perspective view of the improved valve disc.

Fig. V is a sectional view, corresponding to Fig. II, of a modified form of the invention.

Fig. VI is a view, similar to Fig. III of the body-element of the modified form of my invention shown in Fig. V; and, Fig. VII is a like view of the valve seating-component therefor.

Referring more in detail to the drawings, as well as generally to both of the illustrated embodiments, the numeral 1 comprehensively designates what I term the body-member, and 2 the valve seat-member; while it is to be noted that the form of my invention illustrated by Figs. I-IV is of the pressure type, and that shown by Figs. V-VII one of the suction variety.

The body member 1 of the pressure valve comprises cupped outer and inner walls 3, 4, respectively, having flow-openings 5 through the former wall. This body-member 1 also embodies a substantial end or concentric head 6, spaced above the walls 3, 4, by radial webs 7 to define upwardly-convergent outwardly-flaring outlets 8. Attention is directed to the inner body wall 4 which embodies a substantial guard or stop means 9, with an axial orifice 10 therethrough, said stop means having its lower face slightly concaved at 11 for a purpose later on set forth.

The seat-member 2 consists of an annulus provided with a stop rim 12 serving to limit forced-fit engagement in the usual partition or pump chest deck—not shown; and above said rim is a circumferentially reduced part 13 for friction-fitment into the corresponding boring 14 in the lower portion of the body member 1; while the bore 15 of the seat-member is outwardly-flared at 16 so as to aid free-flow therethrough.

The valve disc 17—Fig. IV—is imperforate and suitably formed to provide a shallow concavo-convexed major portion 18 of a diameter substantially conforming with the outer dimension of the body inner wall 4, a concentric seating area 19, and a marginal lip 20. This valve disc 17, it is to be noted, may be struck from sheet-metal, moulded, or otherwise fabricated; and it is to be particularly remarked that the concaved face 11 of the stop means 9 is made substantially conformative with the curvature of the valve disc major portion 18 to prevent hammering-damage or deformation. A spring 21, in compression, is interposed in the cavity 22 between the body-member walls 3, 4 so as to exert its full force against the seating surface 19 of the valve disc 17, said surface coacting with a correspondingly proportioned and machined seat 23 of the member 2; while it is to be particularly noted that the boring 14, above referred to, provides peripheral guidance for the valve disc marginal lip 20, whereby lateral displacement of the latter is prevented.

The body-member 1 of the suction valve, Figs. V—VII, embodies a cylindrical wall 24, a concentric base 25 having arcuate flow-passages 26, and an apertured axial stop means 27 with the exposed surface 28 thereof concaved, for a similar purpose to that described in connection with the surface 11 of Fig. II. In this form of my invention, the valve disc 17 and spring 21 conform in structure and operation with the previous description, hence further explanation is deemed unnecessary.

The seat-member 2, as shown in Figs. V and VII, is formed as a unit and embodies an annular section 29 with radial arms 30, and a central boss 31 having an axial stem 32, for reception of a tripod device 33. This device 33 is normally held in the position shown by Fig. V, in abutment with an actuator means 34, through the medium of a spring 35, intermediate a central recession 36, around the boss 31 and the underside of the device 33. In addition the seat-member 2 is provided with a stop-rim 37 for engagement in the body-member 1, and a marginal shoulder 38 for reception of suitable hold-down means, fragmentarily indicated at 39; while it is to be observed that the underside of the radial arms 30 and boss 31 are concaved at 40, so as to offer no impedance to free flow through the valve as a unit.

From the foregoing, it is thought the operation of both forms of my improved valve will be self-evident, but it is to be particularly observed that the valve disc 17, during actuation, is floatingly-supported; or, in other words, neither of the illustrated types includes any central seating area or support, while it is peripherally guided in an obvious manner.

Minor changes in the proportions and arrangements of the details set forth may be effected without departure from the scope of my invention as defined in the following claim.

Having thus described my invention, what I claim is:

In a valve of the type described, an imperforate valve disc embodying a major shallow concavo-convexed portion surrounded by a concentric seating area, a body-member including inner and outer concentric walls defining an annular cavity with a connecting portion having arcuate flow-passages therethrough, an axially-apertured stop integral with the inner concentric wall having a concave-curvature conforming with the convex-curvature of the valve disc, a ported seat-member engaged in the open end of the body-member, said seat-member having a central boss and radial arms oppositely-concaved with respect to the valve disc concave-curvature, and a spring in the body-member annular cavity exerting its force directly against the valve disc seating area.

MAURICE F. RICHARDSON.